United States Patent
Dietz et al.

(10) Patent No.: US 7,465,137 B2
(45) Date of Patent: Dec. 16, 2008

(54) THREADED FASTENER WITH RETAINER

(75) Inventors: Michael G. Dietz, Oxford, MI (US); Richard S. Brown, Brantford (CA); Charles Earl Abbate, Clinton Township, MI (US); Chris Fenech, Brownstown, MI (US)

(73) Assignee: MNP Corporation, Utica, MI (US)

( * ) Notice: Subject to any disclaimer, the term of this patent is extended or adjusted under 35 U.S.C. 154(b) by 17 days.

(21) Appl. No.: 11/484,821

(22) Filed: Jul. 11, 2006

(65) Prior Publication Data

US 2008/0038086 A1    Feb. 14, 2008

(51) Int. Cl.
*F16B 41/00* (2006.01)
*F16B 25/00* (2006.01)

(52) U.S. Cl. .................. 411/386; 411/301; 411/999

(58) Field of Classification Search .......... 411/393, 411/386, 970, 999, 301–304
See application file for complete search history.

(56) References Cited

U.S. PATENT DOCUMENTS

| | | | |
|---|---|---|---|
| 2,283,494 A | 5/1942 | Erdman | |
| 2,703,725 A * | 3/1955 | Vagi | 292/70 |
| 3,439,575 A * | 4/1969 | Guthrie | 411/386 |
| 3,466,966 A * | 9/1969 | Brown | 411/510 |
| 3,770,036 A | 11/1973 | Sherman | |
| 4,003,286 A | 1/1977 | Hallock | |
| 4,557,651 A | 12/1985 | Peterson | |
| 4,732,519 A | 3/1988 | Wagner | |
| 4,810,145 A * | 3/1989 | Villas | 411/206 |
| 4,952,107 A | 8/1990 | Dupree | |
| 5,094,579 A | 3/1992 | Johnson | |
| 5,547,324 A * | 8/1996 | Durr et al. | 411/304 |
| 5,628,601 A | 5/1997 | Pope | |
| 5,722,139 A | 3/1998 | Ladouceur et al. | |
| 5,803,692 A | 9/1998 | Postadan | |
| 5,947,509 A | 9/1999 | Ricks et al. | |
| 5,967,725 A * | 10/1999 | Voges | 411/386 |
| 6,116,832 A * | 9/2000 | Wolf et al. | 411/383 |
| 6,394,724 B1 | 5/2002 | Kelly et al. | |
| 6,679,666 B2 * | 1/2004 | Mizuno et al. | 411/353 |
| 6,910,841 B2 * | 6/2005 | Isenberg | 411/386 |
| 7,137,766 B2 * | 11/2006 | Weinstein et al. | 411/399 |
| 2004/0136812 A1 | 7/2004 | Kawai et al. | |

OTHER PUBLICATIONS

Print out from Finnveden website, Innovative Screws Solve Several Problems, May 11, 2006, 2 pages.

* cited by examiner

*Primary Examiner*—Flemming Saether
(74) *Attorney, Agent, or Firm*—Reising, Ethington, Barnes, Kisselle, P.C.

(57) ABSTRACT

A fastener element (16) has a head section (18), a threaded shank section (17) with threads (20) at a pitch and a distal end section (22). A retention device (24) is secured to the distal end section and is engageable with a fastener receiving member (14).

6 Claims, 3 Drawing Sheets

THREADED FASTENER WITH RETAINER

TECHNICAL FIELD

The field of this invention relates to a threaded fastener with a retainer at its distal end.

BACKGROUND OF THE DISCLOSURE

Threaded fasteners have long been used to join two or more components. It has been found advantageous to easily prelocate a threaded fastener and mate parts prior to torque tightening the fastener into location by rotating along a thread helix. This is particularly true with assemblies where the orientation and weight of the mating parts require that the parts be held in place while a driving tool is retrieved and placed in location to engage the fastener for tightening the fastener in place.

Previous snap in fasteners have been overly complicated and added unacceptable costs to fasteners when used in high volume during an assembly line operation.

What is needed is a low cost threaded fastener with a retainer that can be pushed into position with a low entry force and be able to resist a much higher exiting or pulling force to temporarily hold two mating parts together.

SUMMARY OF THE DISCLOSURE

In accordance with one aspect of the invention, a fastener assembly has a fastener member with a head section constructed to be engageable with a driving tool. A threaded shank section has threads at a pitch. A retention device member is secured to a distal end section of the fastener member. The retention device is engageable to a fastener receiving member, for example a nut, when the distal end section is inserted into a hole therethrough.

Preferably the distal end section of the threaded fastener member has a circumferential groove. The retention device engages the circumferential groove to be positively engaged onto the distal end section. In one embodiment, the distal end section is in the form of a dog point.

The threaded shank section is self-threading for engaging the hole in the fastener receiving member. The hole is initially unthreaded. It is desireable that the retention device has at least one outer extension flange section angled radially outwardly and axially toward the head section and is sized to engage an inside wall of the hole in the fastener receiving member to provide insertion of the fastener assembly in the hole with a low entry force and to resist higher exiting forces.

In one embodiment, the retention device is a cap member that is molded over the distal end section. The cap member has at least one outer extending flexible flange extending radially outwardly and axially toward the head section. At least one outer extending flange has a pitch corresponding to the pitch of threads on the threaded shank section. The hole in the fastener member can be initially threaded. The distal end section can be axially inserted into the hole with a low entry force and resist greater axial exiting forces and be threaded out of the hole. The flange can snap fit over the threads in the hole when the fastening member is axially pushed in.

According to another aspect of the invention, a fastener assembly has a fastener element with a self-threading shank section, an engageable head section and a distal dog point. The distal dog point has an undercut section spaced from an end. A retention device member in the form of an elastomeric cap is molded over the distal dog point with a rim section inwardly extending to engage the undercut section. The cap has at least one outer flange sized to engage an internal wall of a hole in a fastener receiving member. At least one outer flange is angled radially outwardly and axially toward the head section.

In accordance with another aspect of the invention, a reusable fastener assembly includes a fastener element having a threaded shank section with threads at a pitch, a head section, and a distal end section. The distal end section has an undercut section spaced from an end. A retention device member is engaged to the undercut section with at least one radially extending flange sized to engage internal threads in a hole of a fastener receiving member. At least one flange is tapered radially outwardly and axially toward the head section and is flexible in one direction to snap fit into the internal threads with an axial directed entry force onto the fastener assembly but resist a higher axial exiting force. At least one flange has a pitch corresponding with the pitch of the threads on the threaded shank section and with the internal threads of the hole such that the retention device member can be threaded out of the hole for reuse with the fastener element.

BRIEF DESCRIPTION OF THE DRAWINGS

Reference now is made to the accompanying drawings in which.

DETAILED DESCRIPTION OF THE PREFERRED EMBODIMENT

Figure 1:
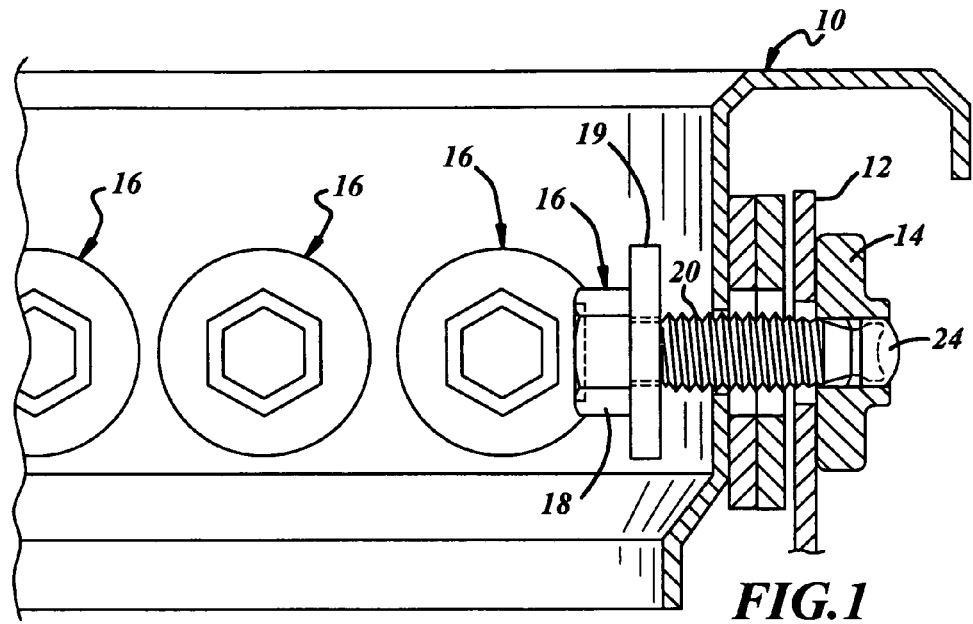
FIG. 1 is a front perspective view and a segmented view showing a plurality of fasteners in accordance with one embodiment of the invention in location temporarily holding an airbag curtain in location.

Referring now to FIG. 1, an airbag anchor and mounting bracket assembly 10 is secured to sheet metal 12 of a motor vehicle through a weld nut 14 secured on the back side of the sheet metal 12. A plurality of fastener assemblies 16 can be temporarily secured to the weld nuts 14 to temporarily hold the anchor and mounting bracket assembly 10 in place to the sheet metal 12 before the fasteners assemblies 16 are fully tightened by an appropriate driving tool (not shown).

Figure 2:
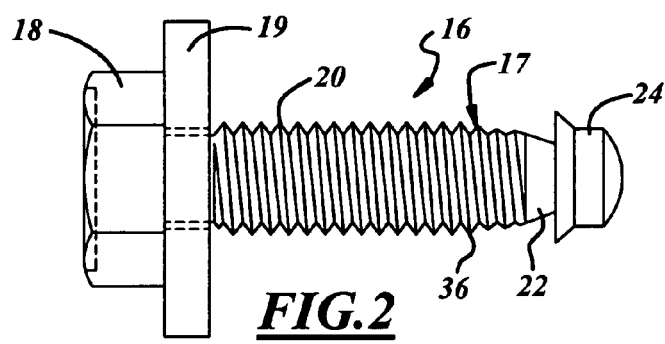
FIG. 2 is side elevation view of one threaded fastener assembly shown in FIG. 1.
Figure 3:
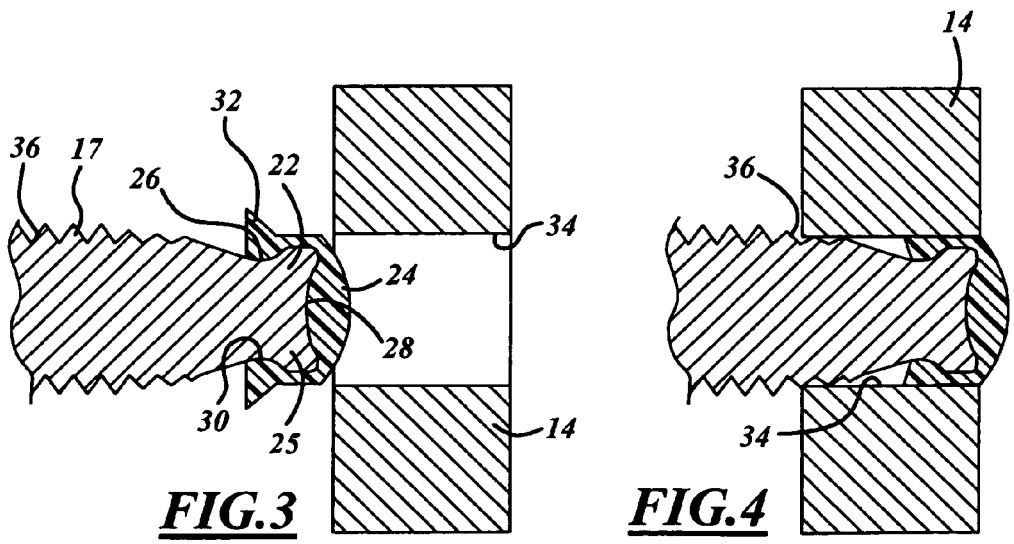
FIG. 3 is a side segmented and fragmentary view of the retainer prior to entry to a nut member.

Referring now to FIGS. 2 and 3, a fastener assembly 16 includes a fastener member 17 and a retainer cap member 24. The fastener member 17 has a head section 18, a threaded shank section 20 that passes through a washer 19. A distal end section 22 is at the opposite end. The distal end section 22 has the cap member 24 molded thereon. The cap member 24 may be a moldable polymer such as commercially available PVC.

The distal end of a section 22 is in the form of a dog point 25 with an undercut groove 26 spaced from the end 28. As shown in FIG. 3, the retainer cap 24 has an inwardly extending retaining rim 30 that engages the groove 26 to form a positive lock with the distal end section 22 of the fastener member to prevent axial removal of the retainer member from the distal end section 22, i.e., the rim 30 of cap member 24 is overmolded into the groove 22 to form a positive engagement.

Figure 4:
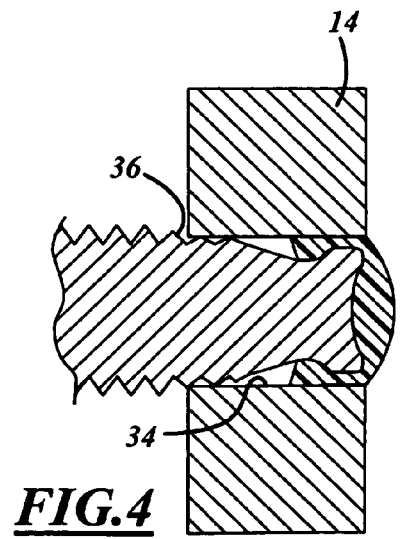
FIG. 4 is a view similar to FIG. 3 showing the retainer engaged in a nut member.

The retainer cap member 24 also has an outwardly extending flange 32 that has a taper radially outward and toward the head section 18. Flange 32 can extend 360 degrees completely about the cap member outer diameter. The flange 32 also has a diameter sized larger then the unthreaded hole 34 in the weld nut 14. As shown in FIG. 4, the fastener assembly can be axially inserted into the nut hole 34. The yieldably flexible nature of the PVC material and the taper of the flange 32 allows ease of entry of the retainer cap into the hole 34. However, the taper and angle of the flange 32 will resist a much higher axially directed exiting force exerted on fastener member 17. As shown in FIG. 4, the fastener assembly 16 may be inserted until the self tapping threads 36 abut the nut 14 about hole 34.

Figure 5:
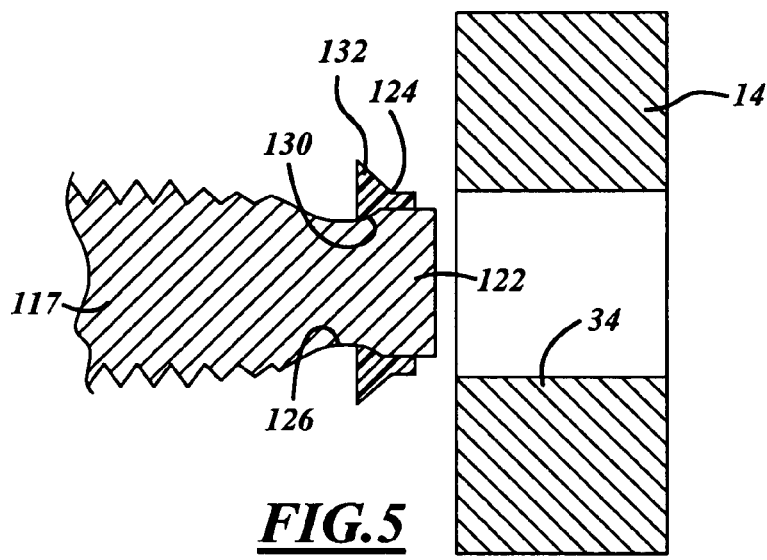
FIG. 5 is a view similar to FIG. 3 showing a modified embodiment.
Figure 6:
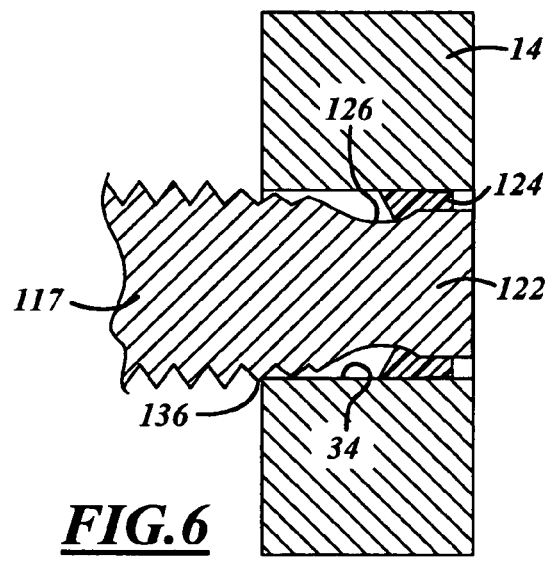
FIG. 6 is a view similar to FIG. 5 showing the modified retainer engaged in a nut member.

Referring to FIGS. 5 and 6, an alternate retainer device 124 is shown on a modified fastener member 117. The fastener member 117 has its dog point distal end section 122 with a groove 126 having a different profile than that shown in the first embodiment. The retainer device 124 has an annular ring shape rather than a cap form such that the dog point distal end section 122 of the fastener member 117 extends entirely through the retainer device 124. The retainer device 124 has a similar rim 130 and outer flange 132 as described for the first embodiment and can be made from a similar material. The threads 136 are similarly the self-threading type. The second embodiment provides the low entry force and higher resistance to exiting forces and functions in the same fashion as the first embodiment.

Figure 7:
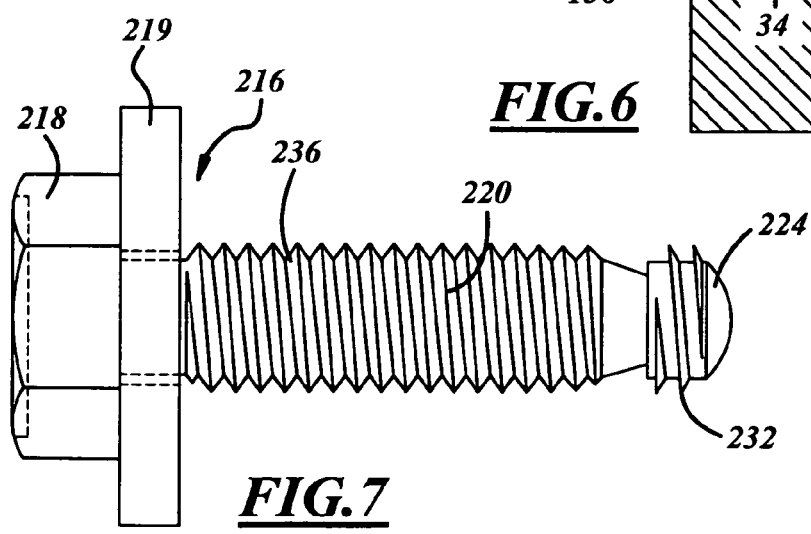
FIG. 7 is a view similar to FIG. 2 showing a threaded fastener with a modified retainer.
Figure 8:
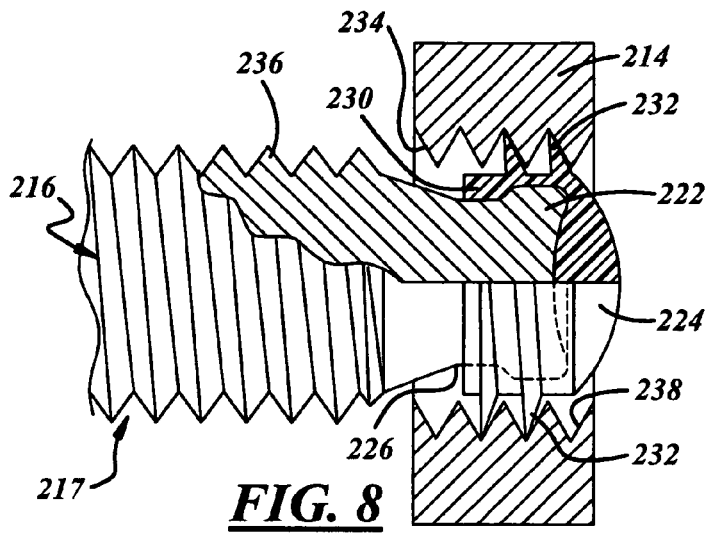
FIG. 8 is a fragmentary side and partially segmented view showing the retainer shown in FIG. 7 engaging a threaded nut.

Referring now to FIGS. 7 and 8, a reusable fastener assembly 216 is shown. The retainer cap 224 has a helical outer flange 232 similarly tapered toward the head section 218. A washer 219 is placed adjacent the head section 218. In addition, the helical outer flange 232 has a pitch that corresponds with the pitch of threads 236 on the threaded shank 220. The inner rim 230 is molded on the dog point distal section 222 of the fastener member 217 in the same fashion as described for the first embodiment with the rim 230 overmolded into groove 226.

As shown in FIG. 8, the flange 232 can be axially snap fitted into the threads 238 of threaded nut 214. However, the shape and angle of the flange 232 will resist much higher axially directed exiting forces to prevent the fastener assembly from axially exiting the nut without rotation. The threads 238 of nut 214 in hole 234 are also pitched at the same angle as the pitch of the helical flange 232 and threads 236.

The fastener member 217 with the retainer cap may be rotated to either fasten the threads into the nut 214 or can be rotated in an opposite rotational direction to remove both the fastener member 217 and the retainer cap 224 from the nut 214 such that the fastener assembly 216 may be reused.

The reusable fastener element shown in FIGS. 7 and 8 are desirable for field use such as attaching armor plating to humvees and the other military vehicles that may need extra armor. The fastener easily allows one person to lift the armor plate and push in the fastener element to temporarily hold the armor plate onto the vehicle while the person retrieves a fastener tool to then tighten the fastener elements in place. The fastener elements can be threadably removed when it is desired to remove the armor from the vehicle and retains its structural integrity and shape to be reused.

Figure 9:
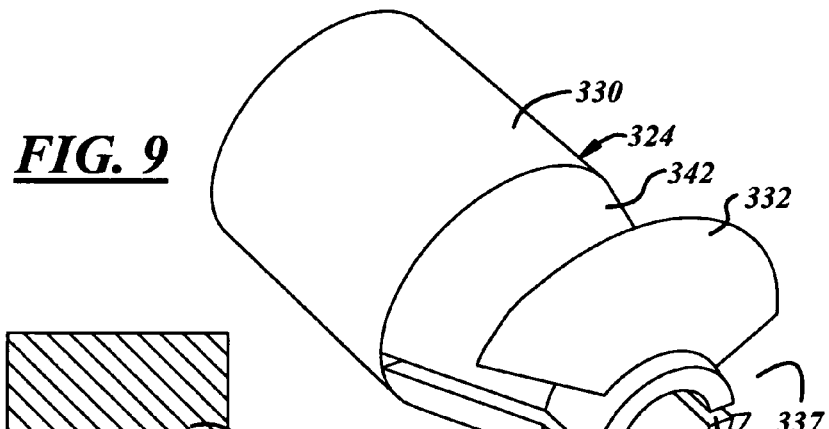
FIG. 9 is a perspective view of an alternate embodiment of a retainer.
Figure 10:
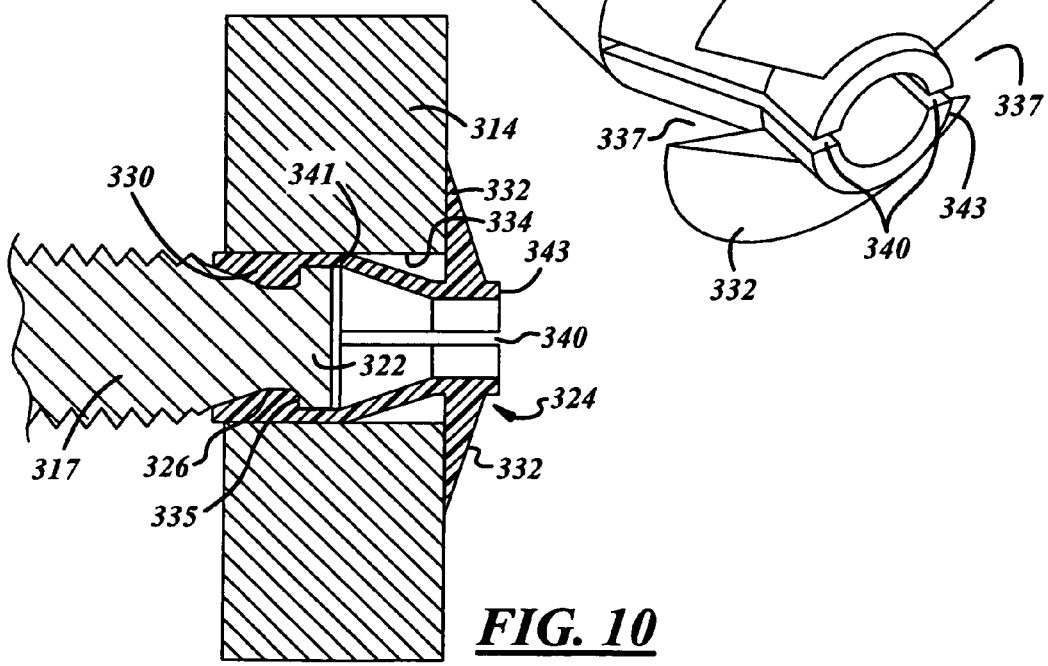
FIG. 10 is a side segmented view illustrating the retainer cap installed onto a fastener member and engaged with a nut member.

All of the above embodiments provide temporary retention with the nut without the need of the fastener assembly protruding beyond the nut. This aspect is advantageous when there is little or no space or clearance behind the nut. However it is foreseen that many applications may provide for a clearance or extra space behind the nut. In these applications a retainer device 324 may have its outer flange 332 as shown in FIGS. 9 and 10 inserted totally through the nut to engage the backside of the nut to prevent the fastener from disengaging. It still has its inner rim section 330 engaging the groove 326 to provide a positive interconnection between the retainer cap and a fastener member. In this embodiment, it is noted that the profile of the undercut groove 326 has transverse shoulder 335 with the dog point distal section 322 and this provides a stronger resistance against exiting pulling forces exerted on the fastener member. The retainer device 324 has spaces 337 between the flange 332 and a pair of axially extending slots 340 extending from distal end section 343 through tapering section 342 and up to rim section 330 to provide extra flexibility to the retainer device 324 as it passes through hole 334.

For all the above described embodiments, a fastener can be temporarily located in either a threaded or unthreaded nut hole holding two members temporarily in place. While these fastener assemblies are particularly suitable to be dimensioned for resisting up to 5 lb. of exiting force without disengaging the nut for retaining the airbag anchor in place, the fastener assemblies may be sized up or down for other applications, including applications with exiting forces exceeding 5 lbs. The fastener can be quickly pushed into place while an operator may then retrieve an appropriate driving tool to then rotate each fastener member along its thread helix to its final tightened condition with the nut. The use of these fastener assemblies provides for a so called third hand for the operator and can speed up an assembly line type operation.

For lighter duty applications, the overmold feature of the rim 30 into a groove 26 may be eliminated and the fastener member may be retained solely by frictional engagement between the cap member molded onto the fastener member.

Other variations and modifications are possible without departing from the scope and spirit of the present invention as defined by the appended claims.

The embodiments in which an exclusive property or privilege is claimed are defined as follows:

1. A fastener assembly comprising:
    a fastener element with a head section constructed to be engageable with a driving tool, a threaded shank section with threads having a pitch and an integrally formed distal end section;
    said distal end section having a circumferential groove;
    a retention device member secured to said distal end section;
    said retention device member engageable to a fastener receiving member when said distal end section is inserted into a hole in said fastener receiving member;
    said retention device engaging said circumferential groove in proximity to a proximate end of the retention device to be positively engaged onto said distal end section and being adheredly molded to the distal section;
    said retention device having at least one outer extension flange with a base axially aligned over said groove section and said flange being angled radially outwardly and axially toward said head section;
    said groove section extending axially beyond said flange in the direction of said head section; and said retention device being sized to engage an inside wall of said hole in said fastener receiving member to provide insertion of said fastener assembly in said hole with a low entry force and to resist higher exiting forces.

2. A fastener assembly as defined in claim 1 further comprising:

said at least one outer extension flange extending 360° about said retention device.

3. A fastener assembly as defined in claim 2 further comprising:

said distal end section being in the form of a dog point with an axially spaced groove spaced from an expanded distal end of said fastener element.

4. A fastener assembly as defined in claim 3 further comprising:

said retention device being a cap member that is molded completely over the distal end section.

5. A fastener assembly as defined in claim 2 further comprising:

said flange being continuously tapered from its base to a radially outer tip.

6. A fastener assembly as defined in claim 1 further comprising:

said flange being continuously tapered from its base to a radially outer tip.

* * * * *